US 6,717,127 B2

(12) United States Patent
Kimura et al.

(10) Patent No.: US 6,717,127 B2
(45) Date of Patent: Apr. 6, 2004

(54) SEMICONDUCTOR IMAGE PICKUP DEVICE HAVING FUNCTION CIRCUIT BLOCK

(75) Inventors: Naoki Kimura, Tokyo (JP); Hiroki Ui, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/161,688

(22) Filed: Jun. 5, 2002

(65) Prior Publication Data

US 2003/0010895 A1 Jan. 16, 2003

(30) Foreign Application Priority Data

Jul. 12, 2001 (JP) ........................................ 2001-212494

(51) Int. Cl.[7] ........................... H01L 27/00; H04N 5/235
(52) U.S. Cl. ................... 250/208.1; 348/230.1
(58) Field of Search ................... 250/208.1, 214 AG; 348/222, 229.1, 230.1, 254, 255, 211, 212, 228, 281, 297, 308, 362

(56) References Cited

U.S. PATENT DOCUMENTS 5,047,861 A  *  9/1991  Houchin et al. ............ 348/247
5,920,345 A  *  7/1999  Sauer ........................ 348/308
5,969,758 A  * 10/1999  Sauer et al. ................ 348/241
5,982,424 A  * 11/1999  Simerly et al. .......... 348/229.1

* cited by examiner

Primary Examiner—Stephone B. Allen
(74) Attorney, Agent, or Firm—Burns, Doane, Swecker & Mathis, LLP

(57) ABSTRACT

To check circuit characteristics of a function circuit block such as a gain circuit, data indicating an initial set point is set in a data set unit setting time period T1. A plurality of electric signals from converting optical signals of pixel cells for an image are accumulated in a pixel array in an accumulating time period T2. In a data outputting time period T3, a plurality of different set points are set in an automatic set point changing block according to the data set in the data set unit. The electric signals are repeatedly corrected in the gain circuit at a gain while changing the gain corresponding to each of the set points. The corrected electric signals corresponding to the set points are output from a semiconductor image pickup device. In a time period T4, the corrected electric signals is calculated, and the gain circuit characteristics are checked.

13 Claims, 8 Drawing Sheets

SEMICONDUCTOR IMAGE PICKUP DEVICE HAVING FUNCTION CIRCUIT BLOCK

BACKGROUND OF THE INVENTION

1. Field of the Invention

The present invention relates to a semiconductor image pickup device such as a complementary metal oxide semiconductor (CMOS) image sensor, a charge coupled device (CCD) or a semiconductor device including the CMOS image sensor or CCD.

2. Description of Related Art

FIG. 7 is a block diagram showing the configuration of a conventional CMOS image sensor representing a conventional semiconductor image pickup device.

In FIG. 7, 1 indicates a conventional CMOS image sensor. 2 indicates each of a plurality of pixel cells for respectively converting an optical signal into an electric signal indicating pixel data. 3 indicates a pixel array which is composed of the pixel cells 2 arranged in a two-dimensional array on a chip surface of the CMOS image sensor 1. The optical signals sent from an object, of which an image is picked up, are received in the pixel array 3 and are convened into the electric signals.

4 indicates a logic input/output terminal for receiving an operation clock signal and data from the outside of the chip and outputting a data output start signal and the like to the outside of the chip. 5 indicates a data set unit for controlling the CMOS image sensor 31 according to the data received in the logic input/output terminal 4. 6 indicates a set point register block for registering the data received in the logic input/output terminal 4, producing a set point for each of a plurality of function circuit blocks according to the data and supplying the set point each function circuit block. 7 indicates a row scanner for selecting a series of pixel cells 2 placed on an arbitrary row of the pixel array 3. 8 indicates a column scanner for selecting a series of pixel cells 2 placed on an arbitrary column of the pixel array 3.

10 indicates a color tone correcting circuit for correcting a color tone (a red component, a green component and a blue component) of the electric signals converted in the pixel array 3 according to the set point sent from the set point register block 6. 11 indicates a gain circuit for correcting the electric signals output from the color tone correcting circuit 10 at a gain (a ratio of the level of each output electric signal to the level of the input electric signal) corresponding to the set point sent from the set point register block 6. 12 indicates a gamma correcting circuit for correcting the electric signals output from the gain circuit 11 to a degree corresponding to the set point sent from the set point register block 6 so as to fit the sensibility of the pixel array 3 to the sensibility of the naked eye. 13 indicates a digital-to-analog (D/A) converter for performing the D/A conversion by using the set point sent from the set point register block 6 and producing a reference voltage Vref. 13a indicates an adder, arranged in the gamma correcting circuit 12, for adding the reference voltage Vref produced in the D/A converter 13 to each electric signal to change the level of the electric signal to a level suitable for a circuit connected to the chip of the CMOS image sensor 1. A group of function circuit blocks 9 is composed of the color tone correcting circuit 10, the gain circuit 11, the gamma correcting circuit 12 with the adder 13a and the D/A converter 13.

14 indicates an analog-to-digital (A/D) converter for performing the A/D conversion for each electric signal corrected in the gamma correcting circuit 12. 15 indicates an output terminal through which each electric signal obtained in the A/D converter 14 is output. 16 indicates an analog pixel output terminal through which each electric signal obtained in the gamma correcting circuit 12 is output.

Next, an operation of the conventional CMOS image sensor 1 will be described below.

In the check of the function of the conventional CMOS image sensor 1, circuit characteristics of the group of function circuit blocks 9 are checked. In this check, many set points ranging from several set points to tens of set points are sent one after another from the set point register block 6 to the group of function circuit blocks 9. Therefore, many gains ranging from one-fold gain to several-fold gain or tens-fold gain are, for example, set in the gain circuit 11.

In a check process of circuit characteristics of a desired function circuit block, data indicating a known set point is sent from the outside of the chip of the conventional CMOS image sensor 1 to the data set unit 5 through the logic input/output terminal 4, the data is registered in the set point register block 6, and the known set point is sent from the set point register block 6 to the desired function circuit block. In this case, a prescribed set point has been already sent to each of the function circuit blocks 9 other than the desired function circuit block. Thereafter, a plurality of optical signals input from the image pickup object to the pixel cells 2 of the pixel array 3 are converted into a plurality of electric signals, the electric signals are corrected in the group of function circuit blocks 9 such as the color tone correcting circuit 10, the gain circuit 11, the gamma correcting circuit 12 with the adder 13a and the D/A converter 13 according to the known set point and the prescribed set points to produce a plurality of corrected analog electric signals, the corrected analog electric signals are converted in the A/D converter 14 into a plurality of corrected digital electric signals, and the corrected digital electric signals are output to the outside of the chip of the conventional CMOS image sensor 1 through the output terminal 15. Also, the corrected analog electric signals are output to the outside of the chip of the conventional CMOS image sensor 1 through the analog pixel output terminal 16.

Thereafter, circuit characteristics of the desired function circuit block are checked according to the optical signals input to the pixel array 3, the corrected analog or digital electric signals and the known set point supplied to the desired function circuit block in the outside of the chip of the conventional CMOS image sensor 1. Therefore, in cases where a plurality of known set points different from each other are sent to the desired function circuit block, circuit characteristics of the desired function circuit block can be precisely checked.

FIG. 8 is an explanatory view of a check sequence of circuit characteristics of a desired function circuit block performed in the conventional CMOS image sensor 1.

As shown in FIG. 8, a first set point is set in the data set unit 5 and is sent to a desired function circuit block in a data set unit setting time period T1. In this case, a prescribed set point has been already sent to each of the function circuit blocks 9 other than the desired function circuit block. Thereafter, when electric signals are prepared in the pixel array 3 during an accumulating time period (or a standby time period) T2, the data outputting is started in the pixel array 3. In detail, in a data outputting time period (or an image pickup time period, for example, corresponding to one frame) T3, all the electric signals are sent from the pixel cells 2 of the pixel array 3 to the group of function circuit blocks 9, and corrected electric signals are output from the group of function circuit blocks 9 to the outside of the conventional CMOS image sensor 1. For example, one electric signal D is acquired in the group of function circuit blocks 9 and is output to the outside in a part of the data outputting time period T3. Thereafter, in a calculating and judging time period T4, the calculation for the electric signals and the judgment (or check) of circuit characteristics of the desired function circuit block are performed in the outside of the conventional CMOS image sensor 1.

Therefore, in this check sequence, in cases where circuit characteristics of the desired function circuit block are checked by sending M set points (first set point, second set point,--, and M-th set point) different from each other to the desired function circuit block one after another, it is required that a series of time periods T1 to T4 is repeated M times.

Because the conventional CMOS image sensor 1 representing the conventional semiconductor image pickup device has the above-described configuration, a problem has arisen that a series of time periods T1 to T4 is required for each set point to check circuit characteristics of the desired function circuit block according to many set points.

Also, a problem has arisen that it takes a lot of time to check circuit characteristics of the group of function circuit blocks 9 in the conventional CMOS image sensor 1.

SUMMARY OF THE INVENTION

An object of the present invention is to provide, with due consideration to the drawbacks of the conventional semiconductor image pickup device, a semiconductor image pickup device in which a series of time periods required to check circuit characteristics of a function circuit block or a plurality of function circuit blocks is shortened.

The object is achieved by the provision of a semiconductor image pickup device comprising a pixel array for converting an optical signal of an image input into an electric signal to pickup the image, an automatic set point changing block for producing a plurality of set points different from each other according to data input from an outside in an image pickup time period of the pixel array, and a function circuit block for correcting the electric signal obtained in the pixel array according to each of the set points produced in the automatic set point changing block in the image pickup time period of the pixel array and outputting the corrected electric signals corresponding to the set points to the outside.

In the above configuration, circuit characteristics of the function circuit block are checked in the outside of the semiconductor image pickup device according to the optical signal input to the pixel array, the corrected electric signals output from the function circuit block and the set points produced in the automatic set point changing block. Accordingly, because the set points different from each other are produced in the automatic set point changing block in the image pickup time period of the pixel array, the corrected electric signals corresponding to the plurality of set points can be output by preparing the electric signal only once, and a series of time periods required to check circuit characteristics of the function circuit block can be shortened.

It is preferred that the automatic set point changing block comprises an increment function register for producing the set points by incrementing a set point by a prescribed value in the image pickup time period of the pixel array. Therefore, a current set point obtained by adding the prescribed value to a preceding set point can be repeatedly sent to the function circuit block.

It is preferred that the automatic set point changing block comprises a decrement function register for producing the set points by decrementing a set point by a prescribed value in the image pickup time period of the pixel array. Therefore, a current set point obtained by subtracting the prescribed value from a preceding set point can be repeatedly sent to the function circuit block.

Also, it is preferred that the automatic set point changing block comprises a shift function register for producing the set points by repeatedly doubling or halving a set point in the image pickup time period of the pixel array. Therefore, a current set point obtained by doubling or halving a preceding set point can be repeatedly sent to the function circuit block.

Also, it is preferred that the automatic set point changing block comprises a plurality of set point registers for registering the set points so as to be read out in the image pickup time period of the pixel array. Therefore, a plurality of arbitrary set points different from each other can be sent to the function circuit block.

Also, it is preferred that the automatic set point changing block comprises a memory for storing the set points so as to be read out in the image pickup time period of the pixel array. Therefore, a plurality of arbitrary set points different from each other can be sent to the function circuit block.

The object is also achieved by the provision of a semiconductor image pickup device comprising a pixel array for converting an optical signal of an image input into an electric signal to pickup the image, a plurality of automatic set point changing blocks for respectively producing a plurality of set points different from each other according to data input from an outside in an image pickup time period of the pixel array, and a plurality of function circuit blocks, corresponding to the automatic set point changing blocks respectively, for respectively receiving each of the set points from the corresponding automatic set point changing block at a timing different from those in the other function circuit blocks, respectively correcting the electric signal obtained in the pixel array according to each of the set points at the corresponding timing in the image pickup time period of the pixel array, and outputting the corrected electric signals corresponding to the set points to the outside.

In the above configuration, the timing of the correction of the electric signal in one function circuit block based on each set point differs from those in the function circuit blocks, and circuit characteristics of the function circuit blocks are checked in the outside of the semiconductor image pickup device according to the optical signal input to the pixel array, the corrected electric signals output from the function circuit blocks and the set points produced in the automatic set point changing block. Accordingly, because the set points different from each other are produced in each automatic set point changing block in the image pickup time period of the pixel array, the corrected electric signals corresponding to the plurality of set points produced in the automatic set point changing blocks can be output by preparing the electric signal only once, circuit characteristics of the function circuit blocks can be minutely checked, and a series of time periods required to check circuit characteristics of the function circuit blocks can be shortened.

It is preferred that each automatic set point changing block comprises an increment function register for producing the set points by incrementing a set point by a prescribed value in the image pickup time period of the pixel array. Therefore, a current set point obtained by adding the prescribed value to a preceding set point can be repeatedly sent to each function circuit block.

Also, it is preferred that each automatic set point changing block comprises a decrement function register for producing the set points by decrementing a set point by a prescribed value in the image pickup time period of the pixel array. Therefore, a current set point obtained by subtracting the prescribed value from a preceding set point can be repeatedly sent to each function circuit block.

Also, it is preferred that each automatic set point changing block comprises a shift function register for producing the set points by repeatedly doubling or halving a set point in the image pickup time period of the pixel array. Therefore, a current set point obtained by doubling or halving a preceding set point can be repeatedly sent to each function circuit block.

Also, it is preferred that each automatic set point changing block comprises a plurality of set point registers for registering the set points so as to be read out in the image pickup time period of the pixel array. Therefore, a plurality of arbitrary set points different from each other can be sent to each function circuit block.

Also, it is preferred that each automatic set point changing block comprises a memory for storing the set points so as to be read out in the image pickup time period of the pixel array. Therefore, a plurality of arbitrary set points different from each other can be sent to each function circuit block.

It is preferred that each automatic set point changing block comprises an automatic setting unit which produces the set points optimum to check the corresponding function circuit block. Therefore, the configuration of each automatic set point changing block can be simplified, and an area of a chip of the semiconductor image pickup device can be reduced.

DETAILED DESCRIPTION OF THE PREFERRED EMBODIMENTS

Embodiments of the present invention will now be described with reference to the accompanying drawings.

Embodiment 1

Figure 1:
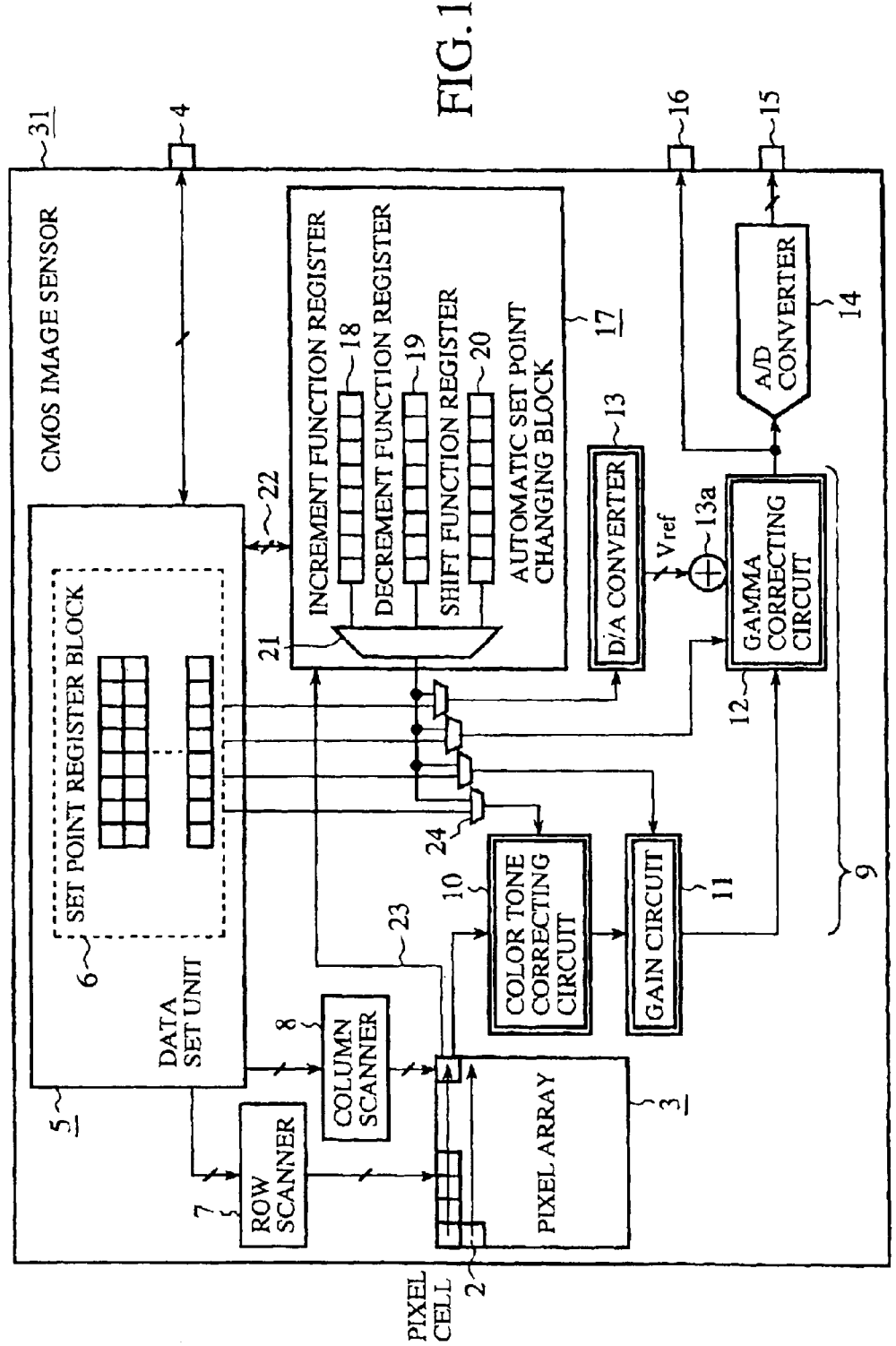
FIG. 1 is a block diagram showing the configuration of a CMOS image sensor representing a semiconductor image pickup device according to a first embodiment of the present invention.

FIG. 1 is a block diagram showing the configuration of a CMOS image sensor representing a semiconductor image pickup device according to a first embodiment of the present invention.

In FIG. 1, 31 indicates a CMOS image sensor. 2 indicates each of a plurality of pixel cells for receiving a plurality of optical signals from an image pickup object and converting the optical signals into a plurality of electric signals indicating pieces of pixel data. 3 indicates a pixel array which is composed of the pixel cells 2 arranged in a two-dimensional array on a chip surface of the CMOS image sensor 31. An end-of-row signal is generated in the pixel array 3 each time pixel data of a pixel placed at the end of a row is output from the pixel array 3.

4 indicates a logic input/output terminal for receiving an operation clock signal and data from the outside of the chip and outputting a data output start signal and the like to the outside of the chip. 5 indicates a data set unit for controlling the CMOS image sensor 31 according to the data received in the logic input/output terminal 4. 6 indicates a set point register block for registering the data received in the logic input/output terminal 4, controlling an automatic set point changing block and a plurality of multiplexers and supplying a prescribed set point to a group of function circuit blocks. 7 indicates a row scanner for selecting a series of pixel cells 2 of an arbitrary row placed on the pixel array 3. 8 indicates a column scanner for selecting a series of pixel cells 2 of an arbitrary column placed on the pixel array 3.

17 indicates an automatic set point changing block for outputting a plurality of set points different from each other in an image pickup time period, for example, corresponding to one frame. 22 indicates a data line connecting the data set unit 5 and the automatic set point changing block 17. 23 indicates an end-of-row signal line through which the end-of-row signal generated in the pixel array 3 is transmitted to the automatic set point changing block 17.

In the automatic set point changing block 17, 18 indicates an increment function register for incrementing a preceding set point by a prescribed value (for example, "1") in response to each end-of-row signal to obtain a current set point and outputting the current set point. 19 indicates a decrement function register for decrementing a preceding set point by a prescribed value (for example, "1") in response to each end-of-row signal to obtain a current set point and outputting the current set point. 20 indicates a shift function register for doubling a preceding set point in response to each end-of-row signal to obtain a current set point and outputting the current set point. 21 indicates a multiplexer for selecting one of the current set points output from the increment function register 18, the decrement function register 19 and the shift function register 20.

24 indicates each of a plurality of multiplexers (a selecting portion) for respectively selecting either the prescribed set point output from the set point register block 6 or the current set point output from the automatic set point changing block 17. 10 indicates a color tone correcting circuit for correcting a color tone (a red component, a green component and a blue component) of each electric signal converted in the pixel array 3 according to each set point selected in the corresponding multiplexer 24. 11 indicates a gain circuit for correcting the electric signals sent from the color tone correcting circuit 10 at a gain (a ratio of the level of each output electric signal to the level of the input electric signal) which corresponds to each set point selected in the corresponding multiplexer 24. 12 indicates a gamma correcting circuit for correcting the electric signals output from the gain circuit 11 to a degree corresponding to each set point selected in the corresponding multiplexer 24 so as to fit the sensibility of the pixel array 3 to the sensibility of the naked eye. 13 indicates a D/A converter for performing the D/A conversion for each set point selected in the corresponding multiplexer 24 to produce a reference voltage Vref. 13a indicates an adder, arranged in the gamma correcting circuit 12, for adding the reference voltage Vref produced in the D/A converter 13 to the electric signal to change the level of the electric signal to a level suitable for a circuit connected to the chip of the CMOS image sensor 31. A group of function circuit blocks 9 is composed of the color tone correcting circuit 10. the gain circuit 11, the gamma correcting circuit 12 with the adder 13a and the D/A converter 13.

14 indicates an A/D converter for performing the A/D conversion for each electric signal corrected in the gamma correcting circuit 12. 15 indicates an output terminal through which each electric signal obtained in the A/D converter 14 is output. 16 indicates an analog pixel output terminal through which each electric signal obtained in the gamma correcting circuit 12 is output.

Next, an operation of the CMOS image sensor 31 will be described below.

To examine the function of the CMOS image sensor 31 in the manufacturing of the CMOS image sensor 31, circuit characteristics of the group of function circuit blocks 9 composed of the color tone correcting circuit 10, the gain circuit 11, the gamma correcting circuit 12 with the adder 13a and the D/A converter 13 are checked.

Figure 2:
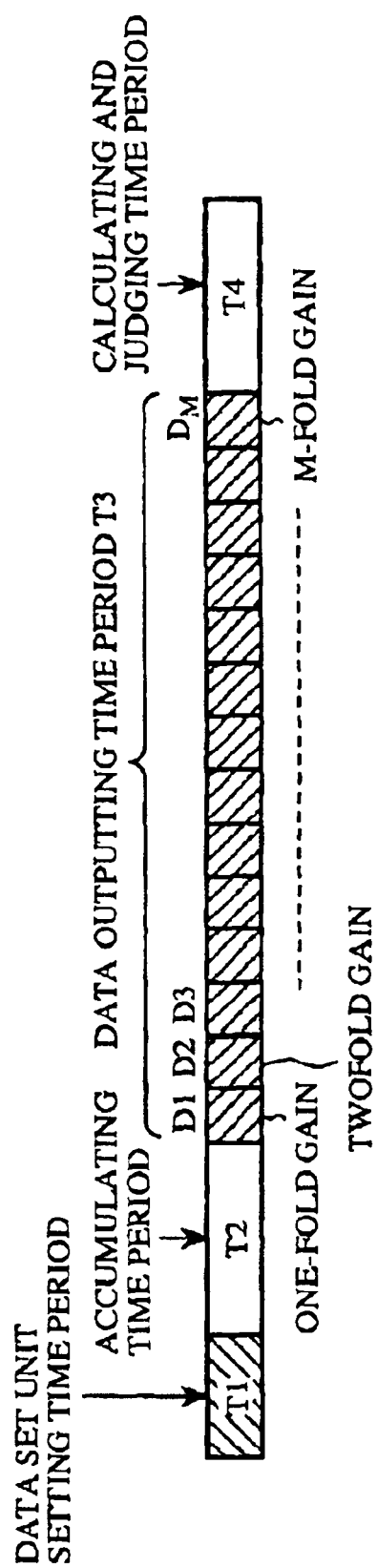
FIG. 2 shows a check sequence of circuit characteristics of one function circuit block according to the first embodiment of the present invention.

FIG. 2 shows a check sequence of circuit characteristics of one function circuit block according to the first embodiment of the present invention.

In the check of circuit characteristics of the group of function circuit blocks 9, the check of circuit characteristics of the gain circuit 11 is described as a representative example. In this case, data (control data) indicating an initial set point, a prescribed set point, the selection in the automatic set point changing block 17 and the selection in the multiplexers 24 is supplied from the outside of the chip of the CMOS image sensor 31 to the data set unit 5 through the logic input/output terminal 4, and the data is registered in the set point register block 6. The data is sent to the automatic set point changing block 17 through the data line 22, and the automatic set point changing block 17 is controlled according to the data. In cases where the increment function register 18 is selected according to the data, a set point output from the increment function register 18 is selected in the multiplexer 21. An output of the increment function register 18 is preset to the initial set point of "1". Also, the multiplexers 24 are controlled according to the data (control data) registered in the set point register block 6. In this case, a current set point output from the automatic set point changing block 17 is selected in only the multiplexer 24 connected to the gain circuit 11, and a prescribed set point (for example, set to "1") output from the set point register block 6 is selected in the multiplexers 24 connected to the color tone correcting circuit 10, the gamma correcting circuit 12 and the D/A converter 13 respectively. The setting of the data to the data set unit 5 and the selection of the current set point or the prescribed set point in the group of function circuit blocks 9 are performed in a data set unit setting time period T1.

Thereafter, a plurality of electric signals (or pieces of pixel data) obtained from a plurality of optical signals input to the pixel cells 2 are accumulated in the pixel array 3 in an accumulating time period T2, and the electric signals of all the pixel cells 2 of the pixel array 3 are output to the outside of the chip of the CMOS image sensor 31 through the group of function circuit blocks 9, the output terminal 15 and the analog pixel output terminal 16 in a data outputting time period T3. During the data outputting time period T3, the electric signals are corrected according to the current set point and the prescribed set point in the color tone correcting circuit 10, the gain circuit 11, the gamma correcting circuit 12 with the adder 13a and the D/A converter 13, and the corrected electric signals are converted into digital signals in the A/D converter 14.

Here, when a plurality of electric signals of a first row are output from the pixel array 3 to the group of function circuit blocks 9 in a first part of the data outputting time period T3, the initial set point of "1" set in the increment function register 18 is sent to the gain circuit 11 through the multiplexer 21 and the multiplexer 24 connected to the gain circuit 11, and the gain is set to one-fold gain in the gain circuit 11. Also, the prescribed set point (for example, set to "1") of the set point register block 6 is sent to the color tone correcting circuit 10, the gamma correcting circuit 12 and the D/A converter 13. Thereafter, the electric signals corrected in the group of function circuit blocks 9 are output from the CMOS image sensor 31 as pieces of pixel data D1.

Also, an end-of-row signal is output from the pixel array 3 to the automatic set point changing block 17 through the end-of-row signal 23 when the outputting of the electric signals of the current row is completed. In the automatic set point changing block 17, the preceding set point of the increment function register 18 is incremented in response to the end-of-row signal to produce a current set point set to "2", and this current set point is sent to the gain circuit 11. Therefore, in a second part of the data outputting time period T3, the gain is set to twofold gain in the gain circuit 11, a plurality of electric signals of a second row output from the pixel array 3 are corrected in the gain circuit 11 at twofold gain and are corrected in the color tone correcting circuit 10, the gamma correcting circuit 12 with the adder 13a and the D/A converter 13 by using the prescribed set point, and the corrected electric signals are output from the CMOS image sensor 31 as pieces of pixel data D2. In this case, the prescribed set point sent to the color tone correcting circuit 10, the gamma correcting circuit 12 and the D/A converter 13 is fixed.

As is described above, in the data outputting time period T3, the set point registered in the increment function register 18 is incremented each time the electric signals of one row are output from the pixel array 3, the gain set in the gain circuit 11 is increased from one-fold gain to the M-fold gain, the electric signals of each row are corrected in the group of function circuit blocks 9 including the gain circuit 11 in which the gain is increased, and pieces of pixel data D1, D2,--, $D_M$ produced from the optical signals of the M rows of the pixel array 3 are output from the CMOS image sensor 31 to the outside. Thereafter, the calculation for the pieces of pixel data D1, D2,--, $D_M$ and the judgment (or check) for circuit characteristics of the gain circuit 11 are performed in the outside of the CMOS image sensor 31 in a calculating and judging time period T4. That is to say, circuit characteristics of the gain circuit 11 for the set points are checked according to the optical signals input to the pixel array 3, the electric signals output from the group of function circuit blocks 9 and the set points supplied from the outside to the group of function circuit blocks 9.

In the first embodiment, the increment function register 18 is selected by the multiplexer 21. However, it is applicable that the decrement function register 19 or the shift function register 20 be selected by the multiplexer 21 in place of the increment function register 18. In the decrement function register 19, an arbitrary value is preset as an initial value, a current set point is obtained by decrementing the initial value by a prescribed value each time the end-of-row signal is received, and the current set point is output.

In the shift function register 20, the least significant bit (LSB) is preset to "1", and the other bits are preset to "0". Each time the end-of-row signal is received, the shift operation to the left is performed while setting "0" to the LSB. That is to say, the set point is doubled each time the end-of-row signal is received. Therefore, because the gain set in the gain circuit 11 is changed in the order of one-fold gain, twofold gain, fourfold gain, eightfold gain,--, $2^{(M-1)}$-fold gain in that order, the shift function register 20 is effective to check circuit characteristics of the gain circuit 11. Also, in the shift function register 20, as another shift method, the most significant bit (MSB) is preset to "1", and the other bits are preset to "0". Each time the end-of-row signal is received, the shift operation to the right is performed while setting "0" to the MSB. That is to say, the set point is halved each time the end-of-row signal is received. Therefore, because the gain set in the gain circuit 11 is changed in the order of $2^{(M-1)}$-fold gain,--, eightfold gain, fourfold gain, twofold gain and one-fold gain in that order.

Also, in the first embodiment, the increment in the increment function register 18 is performed each time the electric signals of one row are output to the group of function circuit block 9. However, it is applicable that the increment in the increment function register 18 be performed every plurality of rows or every several pixels, of which the number is arbitrary, by using a calculating unit or an operation clock signal.

Also, in the first embodiment, the current set point of the automatic set point changing block 17 is sent to only the gain circuit 11. However, it is applicable that the current set point of the automatic set point changing block 17 be sent to the color tone correcting circuit 10, the gamma correcting circuit 12 and/or the D/A converter 13 in place of (or in addition to) the gain circuit 11. In this case, circuit characteristics of the color tone correcting circuit 10, the gamma correcting circuit 12 and/or the D/A converter 13 can be checked in place of (or in addition to) circuit characteristics of the gain circuit 11.

Also, in the first embodiment, the prescribed set point set to "1" is supplied from the set point register block 6 to the color tone correcting circuit 10, the gamma correcting circuit 12 and/or the D/A converter 13. However, it is applicable that the prescribed set point of the set point register block 6 be preset to an arbitrary value.

Accordingly, in the first embodiment, because a plurality of set points different from each other can be sent from the automatic set point changing block 17 to one function circuit block (or a plurality of function circuit blocks) in the data outputting time period T3 (or one image pickup time period of the pixel array 3, for example, corresponding to one frame), all the electric signals accumulated in the pixel array 3 can be corrected in the group of function circuit blocks 9 and are output to the outside of the CMOS image sensor 31 in the data outputting time period T3, and a series of time periods required to check circuit characteristics of the function circuit block (or the plurality of function circuit blocks 9) can be shortened.

Embodiment 2

Figure 3:
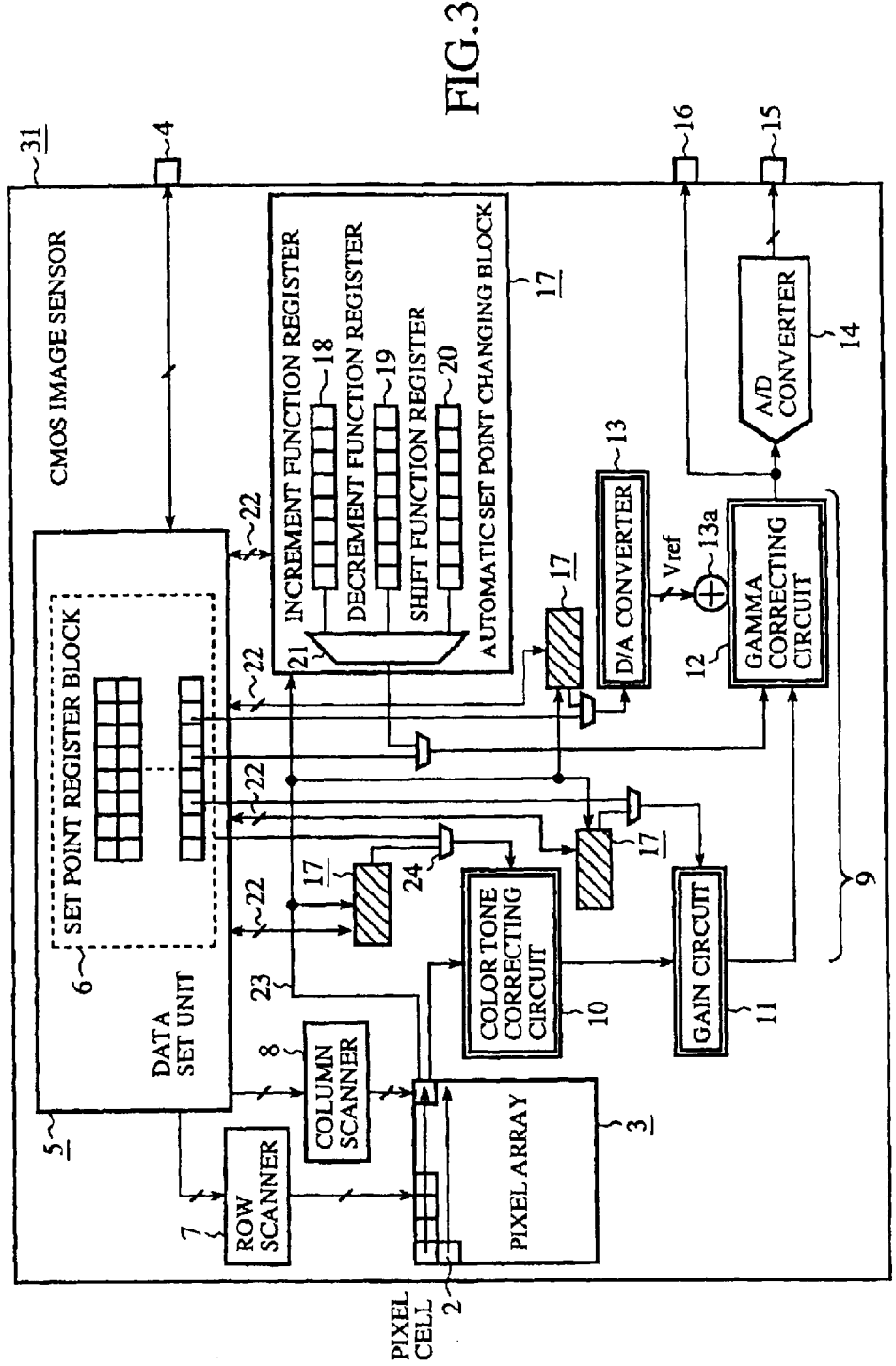
FIG. 3 is a block diagram showing the configuration of a CMOS image sensor representing a semiconductor image pickup device according to a second embodiment of the present invention.

FIG. 3 is a block diagram showing the configuration of a CMOS image sensor representing a semiconductor image pickup device according to a second embodiment of the present invention. The constituent elements, which are the same as those shown in FIG. 1, are indicated by the same reference numerals as those of the constituent elements shown in FIG. 1, and additional description of those constituent elements is omitted.

In a second embodiment, as shown in FIG. 3, the automatic set point changing block 17 connected to the color tone correcting circuit 10 through one multiplier 24, the automatic set point changing block 17 connected to the gain circuit 11 through one multiplier 24, the automatic set point changing block 17 connected to the gamma correcting circuit 12 through one multiplier 24 and the automatic set point changing block 17 connected to the D/A converter 13 through one multiplier 24 are arranged in the CMOS image sensor 31.

Figure 4:
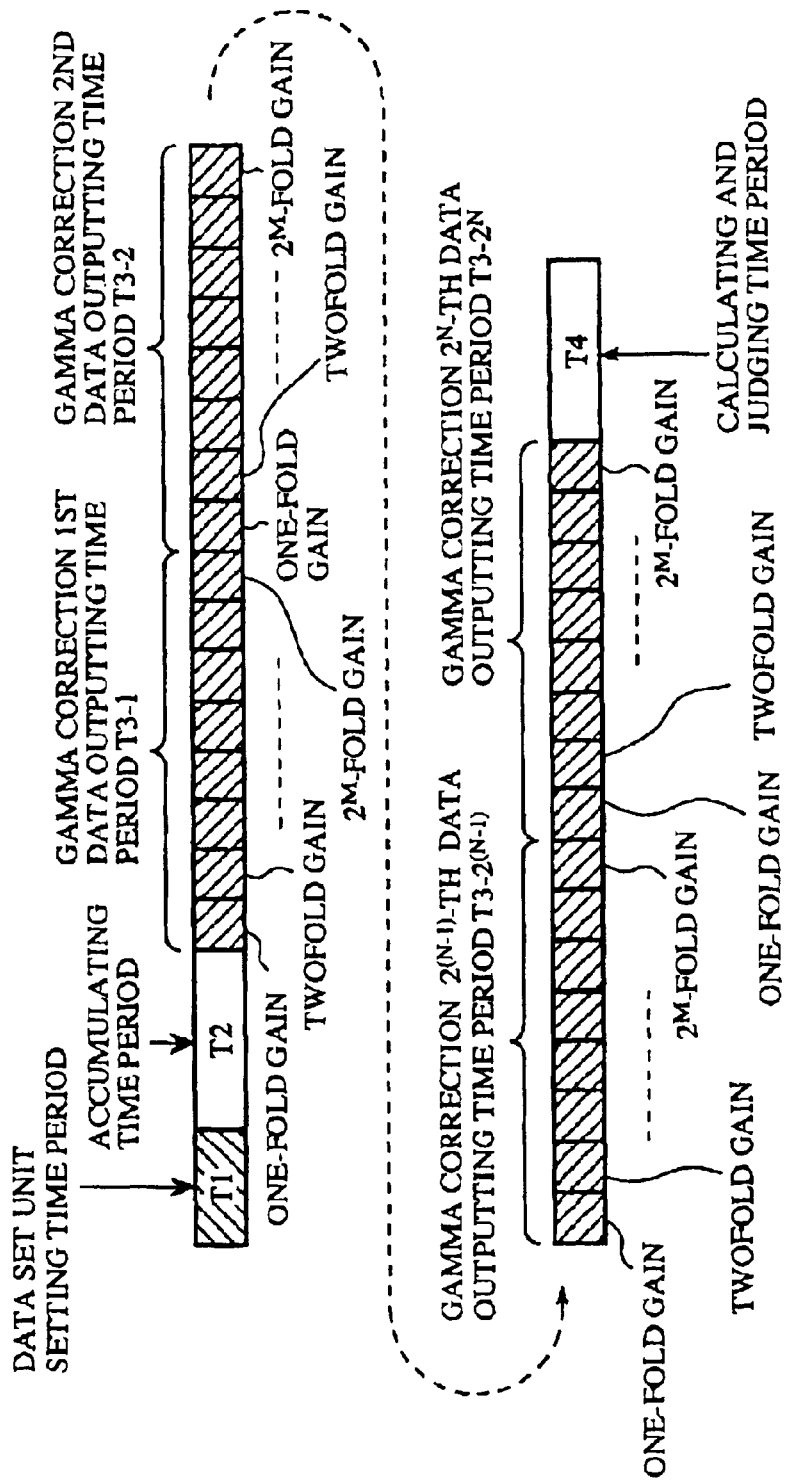
FIG. 4 shows a check sequence of circuit characteristics of both a gain circuit and a gamma correcting circuit according to the second embodiment of the present invention.

FIG. 4 shows a check sequence of circuit characteristics of both the gain circuit 11 and the gamma correcting circuit 12 according to the second embodiment of the present invention.

Next, an operation of the CMOS image sensor 31 different from that in the first embodiment will be described below. The check of circuit characteristics of both the gain circuit 11 and the gamma correcting circuit 12 is described as a representative example. In this case, data indicating an initial set point of each automatic set point changing block 17 and a prescribed set point is supplied from the outside of the chip of the CMOS image sensor 31 to the data set unit 5 through the logic input/output terminal 4, the data is registered in the set point register block 6, and the data indicating the initial set point is sent to each automatic set point changing block 17 through the data line 22. Also, a set point output from the automatic set point changing block 17 corresponding to the gain circuit 11 is selected in the multiplexer 24 connected to the gain circuit 11, a set point output from the automatic set point changing block 17 corresponding to the gamma correcting circuit 12 is selected in the multiplexer 24 connected to the gamma correcting circuit 12, and the prescribed set point output from the set point register block 6 is selected in the other multiplexers 24 connected to the color tone correcting circuit 10 and the D/A converter 13 respectively. The setting of the data to the data set unit 5 and the selection of the current set point or the prescribed set point in the multipliers 24 are performed in a data set unit setting time period T1.

Thereafter, a plurality of electric signals (or pieces of pixel data) obtained from a plurality of optical signals input to the pixel cells 2 are accumulated in the pixel array 3 in an accumulating time period T2 in the same manner as in the first embodiment.

In cases where the shift function register 20 is selected in each of the automatic set point changing blocks 17 corresponding to the gain circuit 11 and the gamma correcting circuit 12 respectively, set points set to "$2^i$" (i=0 to M) are sent to the gain circuit 11 one after another, and set points set to "$2^j$" (j=0 to N) are sent to the gamma correcting circuit 12 one after another.

In detail, in a gamma correction first data outputting time period T3–1 of a data outputting time period T3, an initial set point of "$2^0$" output from the automatic set point changing block 17 corresponding to the gamma correcting circuit 12 is sent to the gamma correcting circuit 12 to check circuit characteristics of the gamma correcting circuit 12, the gain in the gain circuit 11 is changed in the order of one-fold gain, twofold gain,--, and $2^M$-fold gain in the same manner as in the first embodiment to check circuit characteristics of the gain circuit 11 by using the electric signals output from the pixel cells 2 of the first row, the second row,--, and the $2^{(M+1)}$-th row, and pieces of pixel data D1, D2,--, $D2^M$ corresponding to the first set point set in the gamma correcting circuit 12 are output from the CMOS image sensor 31 to the outside.

Thereafter, the set point output from the automatic set point changing block 17 to the gamma correcting circuit 12 is changed each time the end-of-row signal indicating the end of the final row (in this example, the (M+1)-th row) is received in the automatic set point changing block 17 corresponding to the gamma correcting circuit 12. In other words, the set point is changed each time the gain change in the order of one-fold gain, twofold gain,--, and $2^M$-fold gain is completed in the gain circuit 11. Therefore, in a gamma correction second data outputting time period T3-2 of the data outputting time period T3, a second set point of "$2^1$" output from the automatic set point changing block 17 corresponding to the gamma correcting circuit 12 is sent to the gamma correcting circuit 12 to check circuit characteristics of the gamma correcting circuit 12, the gain in the gain circuit 11 is changed in the order of one-fold gain, twofold gain,--, and $2^M$-fold gain to check circuit characteristics of the gain circuit 11 by using the electric signals again output from the pixel cells 2 of the first row, the second row,--, and the $2^{(M+1)}$-th row, and pieces of pixel data D1, D2,--, $D2^M$ corresponding to the second set point set in the gamma correcting circuit 12 are output from the CMOS image sensor 31 to the outside.

Finally, in a gamma correction $2^N$-th data outputting time period T3-$2^N$ of the data outputting time period T3, a final set point of "$2^N$" output from the automatic set point changing block 17 corresponding to the gamma correcting circuit 12 is sent to the gamma correcting circuit 12 to check circuit characteristics of the gamma correcting circuit 12, the gain in the gain circuit 11 is changed in the order of one-fold gain, twofold gain,--, and $2^M$-fold gain to check circuit characteristics of the gain circuit 11 by using the electric signals again output from the pixel cells 2 of the first row, the second row,--, and the $2^{(M+1)}$-th row, and pieces of pixel data D1, D2,--, $D2^M$ corresponding to the final set point set in the gamma correcting circuit 12 are output from the CMOS image sensor 31 to the outside.

Thereafter, in a calculating and judging time period T4, the calculation for the pieces of pixel data D1, D2,--, $D2^M$ corresponding to the first to final set points set in the gamma correcting circuit 12 is performed in the outside of the CMOS image sensor 31, and the judgment (or check) for circuit characteristics of both the gain circuit 11 and the gamma correcting circuit 12 is performed in the outside of the CMOS image sensor 31.

As is described above, in the second embodiment, a timing of the correction of the electric signals base on each set point in one function circuit block such as the gain circuit 11 differs from a timing of the correction of the electric signals in another function circuit block such as the gamma correcting circuit 12. For example, a set point sent to the gamma correcting circuit 12 is changed each time all set points are sent to the gain circuit 11, and all set points are finally sent to the gamma correcting circuit 12 in the data outputting time period T3 (or one image pickup time period of the pixel array 3, for example, corresponding to one frame). Accordingly, circuit characteristics of a plurality of function circuit blocks can be minutely checked.

Also, it is not required to again accumulate all the electric signals each time a set point sent to the gamma correcting circuit 12 is changed. Therefore, one data set unit setting time period T1 and one accumulating time period T2 are only required to check circuit characteristics of a plurality of function circuit blocks. Accordingly, a plurality of set points different from each other can be sent from the automatic set point changing block 17 to each of a plurality of function circuits in the data outputting time period T3 (or one image pickup time period of the pixel array 3, for example, corresponding to one frame), and a series of time periods required to check circuit characteristics of the function circuit blocks can be shortened.

Embodiment 3

Figure 5:
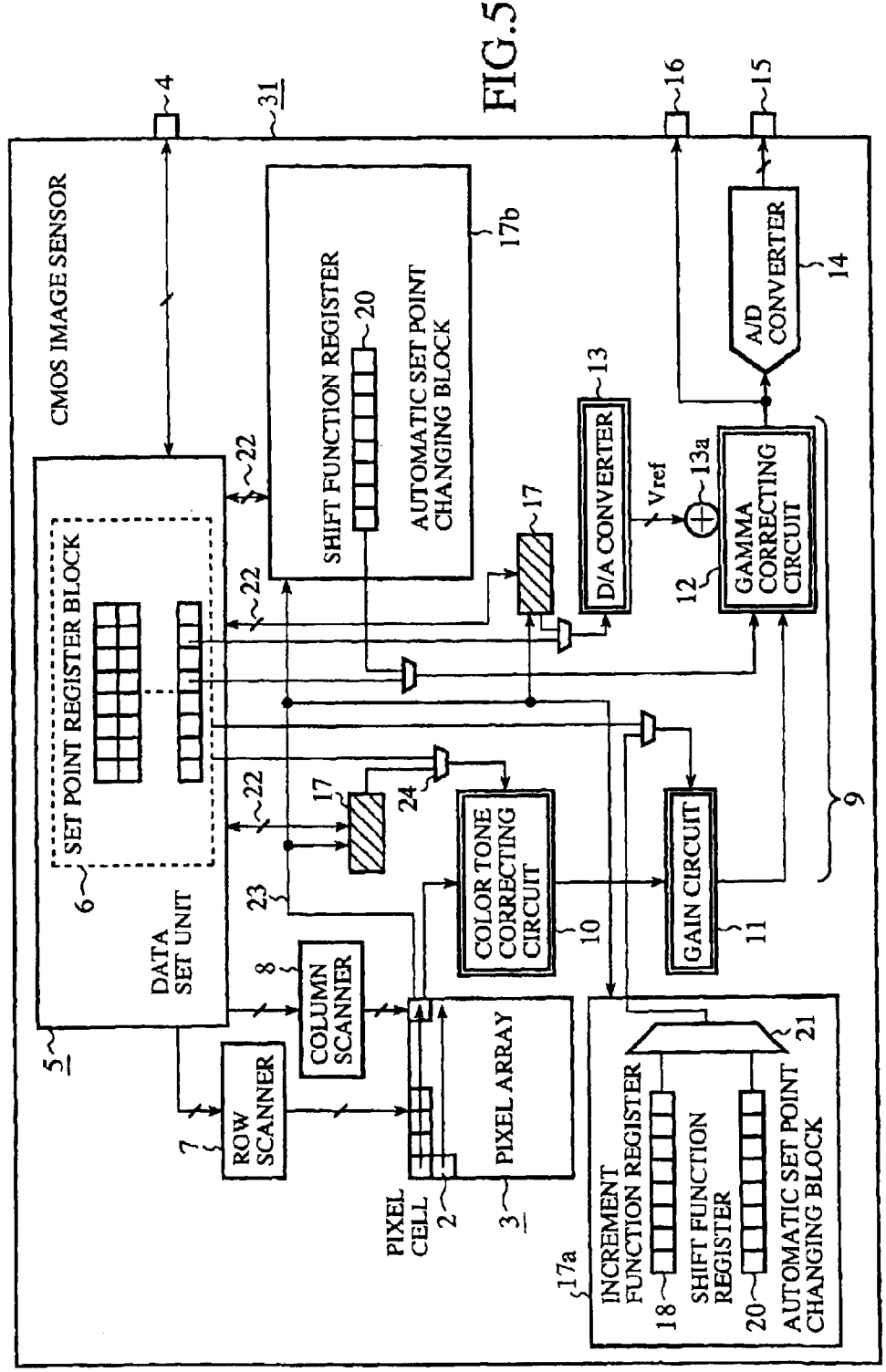
FIG. 5 is a block diagram showing the configuration of a CMOS image sensor representing a semiconductor image pickup device according to a third embodiment of the present invention.

FIG. 5 is a block diagram showing the configuration of a CMOS image sensor representing a semiconductor image pickup device according to a third embodiment of the present invention. The constituent elements, which are the same as those shown in FIG. 3, are indicated by the same reference numerals as those of the constituent elements shown in FIG. 3, and additional description of those constituent elements is omitted.

In a third embodiment, as shown in FIG. 5, an automatic set point changing block 17a corresponding to the gain circuit 11 and an automatic set point changing block 17b corresponding to the gamma correcting circuit 12 are arranged in the CMOS image sensor 31. The automatic set point changing block 17a has the increment function register 18 and the shift function register 20. The automatic set point changing block 17b has only the shift function register 20.

Next, an operation of the CMOS image sensor 31 different from that in the second embodiment will be described below.

Though the automatic set point changing blocks 17 corresponding to the group of function circuit blocks 9 are arranged in the second embodiment, an automatic set point changing block having a type of automatic setting register (or types of automatic setting registers) optimum to each function circuit block is arranged for the function circuit block. In detail, because a series of set points produced in either the increment function register 18 or the shift function register 20 are optimum to check circuit characteristics of the gain circuit 11, in cases where circuit characteristics of the gain circuit 11 are checked, a series of set points produced in the automatic set point changing block 17a are sent to the gain circuit 11. Also, because a series of set points produced in the shift function register 20 are optimum to check circuit characteristics of the gamma correcting circuit 12, in cases where circuit characteristics of the gamma correcting circuit 12 are checked, a series of set points produced in the automatic set point changing block 17b are sent to the gain circuit 11.

Accordingly, in the third embodiment, because the automatic set point changing block is optimized for each function circuit block, the automatic set point changing block corresponding to each function circuit block can be simplified, and an area occupied by the chip of the CMOS image sensor 31 can be reduced.

Embodiment 4

Figure 6:
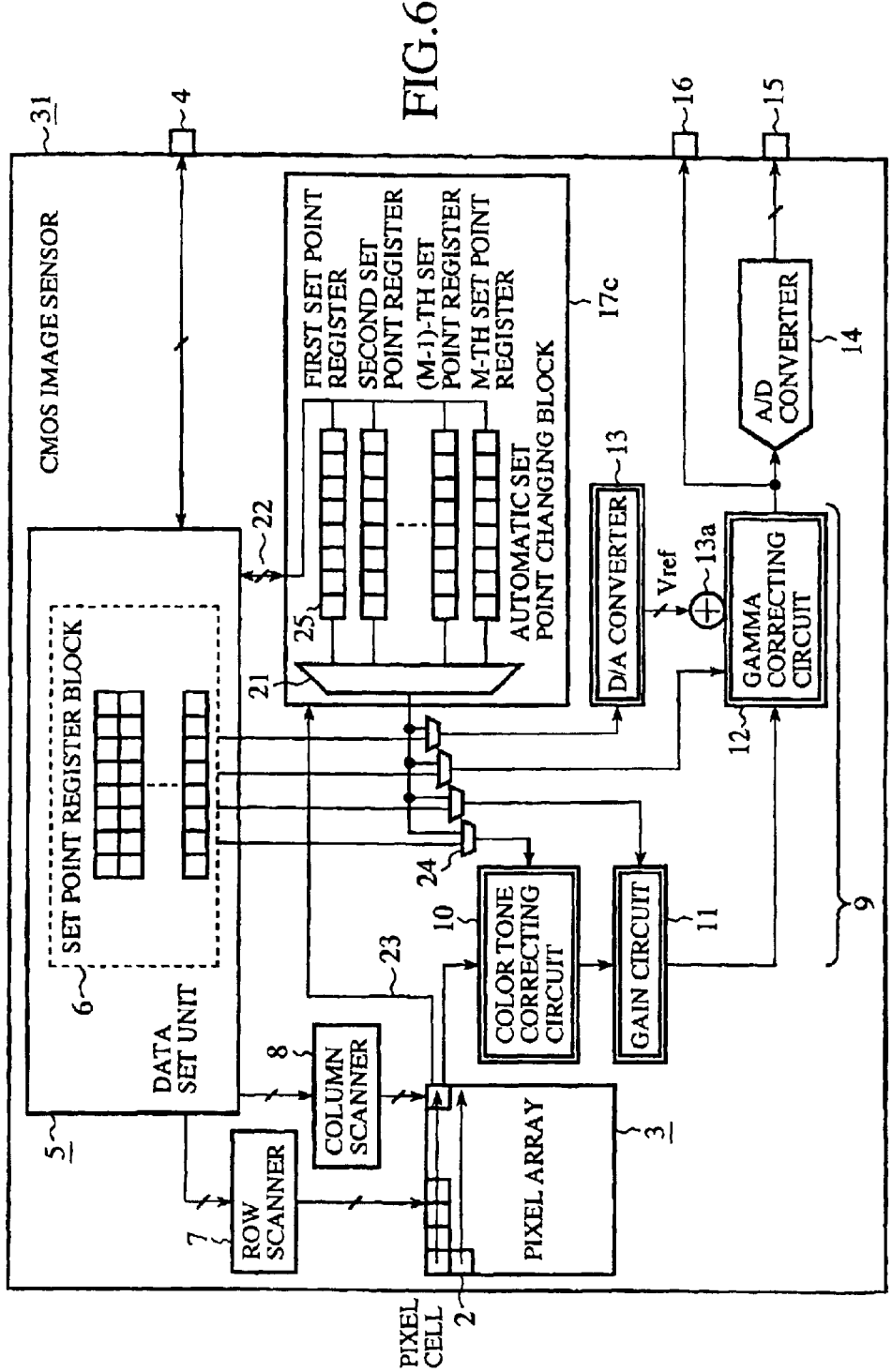
FIG. 6 is a block diagram showing the configuration of a CMOS image sensor representing a semiconductor image pickup device according to a fourth embodiment of the present invention.
Figure 7:
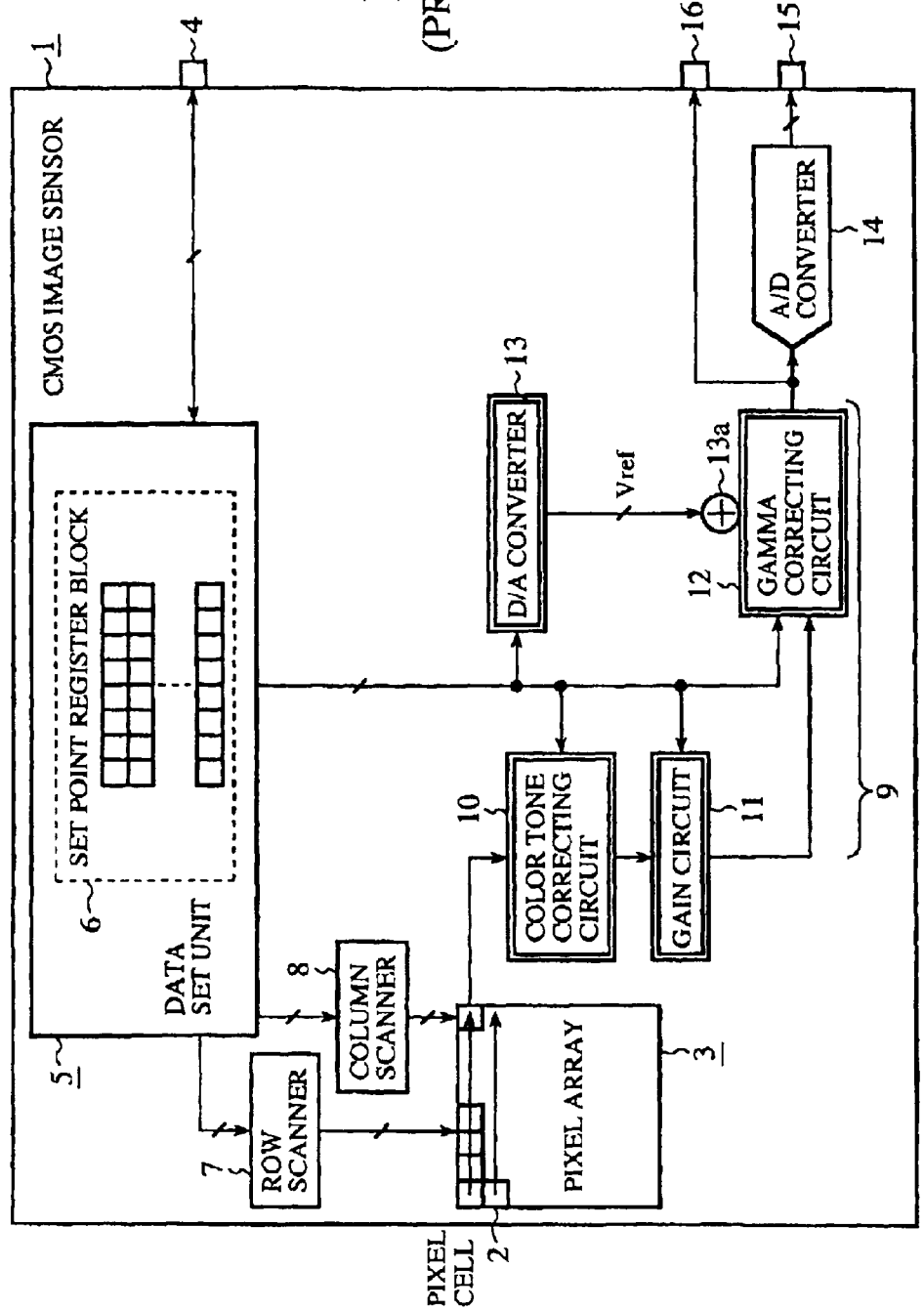
FIG. 7 is a block diagram showing the configuration of a conventional CMOS image sensor representing a conventional semiconductor image pickup device.
Figure 8:
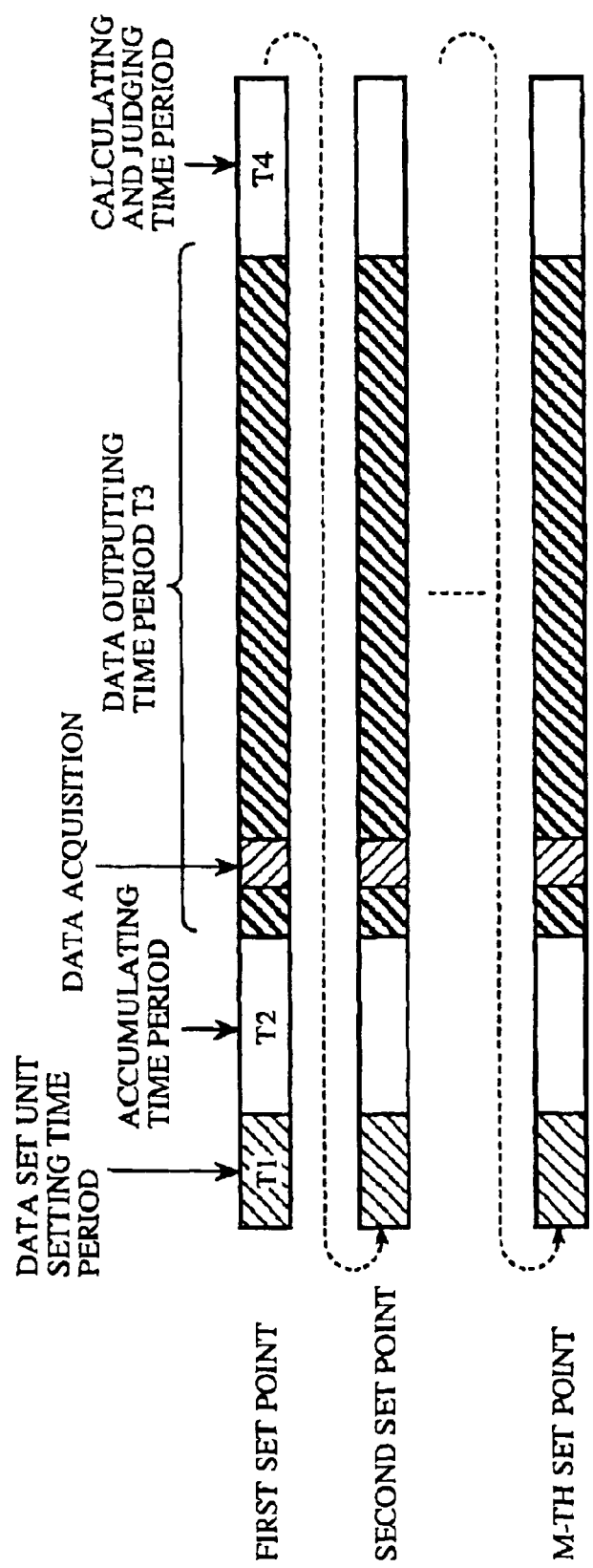
FIG. 8 is an explanatory view of a check sequence of circuit characteristics of a function circuit block performed in the conventional CMOS image sensor shown in FIG. 7.

FIG. 6 is a block diagram showing the configuration of a CMOS image sensor representing a semiconductor image pickup device according to a fourth embodiment of the present invention. The constituent elements, which are the same as those shown in FIG. 1, are indicated by the same reference numerals as those of the constituent elements shown in FIG. 1, and additional description of those constituent elements is omitted.

In a fourth embodiment, as shown in FIG. 6, a series of set points produced in an automatic set point changing block 17c are sent to the color tone correcting circuit 10, the gain circuit 11, the gamma correcting circuit 12 and/or the D/A converter 13 through the multiplexer 24. The automatic set point changing block 17c has a first set point register 25, a second set point register 25,--, an (M−1)-th set point register 25 and an M-th set point register 25.

Next, an operation of the CMOS image sensor 31 different from that in the first embodiment will be described below.

Data indicating a plurality of arbitrary set points different from each other and a prescribed set point (for example, set to "1") is registered in the set point register block 6. The number of arbitrary set points is M. The data is sent to the automatic set point changing block 17c through the data line 22, and the arbitrary set points are set in the set point registers 25 respectively. Thereafter, circuit characteristics of the gain circuit 11 are checked as a representative example.

In detail, a set point output from the automatic set point changing block 17c is selected in only the multiplexer 24 connected to the gain circuit 11, and the prescribed set point output from the set point register block 6 is selected in the multiplexers 24 connected to the color tone correcting circuit 10, the gamma correcting circuit 12 and the D/A converter 13 respectively. Thereafter, the set point registered in the first set point register 25 of the automatic set point changing block 17c is sent to the gain circuit 11 as an initial set point to check circuit characteristics of the gain circuit 11. Thereafter, the selection of the set point register 25 performed in the multiplexer 21 of the automatic set point changing block 17c is changed each time the end-of-row signal produced in the pixel array 3 is received in the automatic set point changing block 17c. Therefore, the set point registered in the second set point register 25,--, the set point registered in the (M-1)-th set point register 25 and the set point registered in the M-th set point register 25 are sent to the gain circuit 11 in that order to check circuit characteristics of the gain circuit 11.

In the fourth embodiment, the arbitrary set points different from each other are set in the set point registers 25 of the automatic set point changing block, 17c respectively. However, it is applicable that a memory be arranged in place of the automatic set point changing block 17c. In this case, a plurality of arbitrary set points different from each other are stored in the memory through the logic input/output terminal 4, the data set unit 5 and the data line 22, the set point read out from the memory is changed each time the end-of-row signal produced in the pixel array 3 is output, and the set points read out from the memory are sent to the gain circuit 11 in a prescribed order.

Also, it is applicable that the automatic set point changing block 17c or a memory be arranged in the CMOS image sensor 31 in place of each automatic set point changing block 17 in the second or third embodiment.

As is described above, in the fourth embodiment, circuit characteristics of each function circuit block can be checked during the data outputting time period T3 by using a series of arbitrary set points received in the function circuit block in the prescribed order, and a series of time periods required to check circuit characteristics of a function circuit block or a plurality of function circuit blocks can be shortened.

What is claimed is:

1. A semiconductor image pickup device having a function to check a function circuit block, comprising a pixel array:
    a pixel array for converting an optical signal of an image input into an electric signal to pickup the image;
    an automatic set point changing block for producing a plurality of set points, which are different from each other, according to data input from outside the semiconductor image pickup device in an image pickup time period of the pixel array corresponding to one frame; and
    the function circuit block for correcting the electric signal obtained in the pixel array according to each of the set points in the image pickup time period of the pixel array, corresponding to one frame and for outputting the corrected electric signals, corresponding to the set points, to the outside;
    a set point register block for supplying a set point and control data to the function circuit block; and
    a selecting portion for selecting the respective set points of the function circuit block from the set point register block or the automatic set point changing block according to the control data from the set point register block.

2. A semiconductor image pickup device according to claim 1, wherein the automatic set point changing block comprises an increment function register for producing the set points by incrementing a set point by a prescribed value in the image pickup time period of the pixel array.

3. A semiconductor image pickup device according to claim 1, wherein the automatic set point changing block comprises a decrement function register for producing the set points by decrementing a set point by a prescribed value in the image pickup time period of the pixel array.

4. A semiconductor image pickup device according to claim 1, wherein the automatic set point changing block comprises a shift function register for producing the set points by repeatedly doubling or halving a set point in the image pickup time period of the pixel array.

5. A semiconductor image pickup device according to claim 1, wherein the automatic set point changing block comprises a plurality of set point registers for registering the set points so as to be read out in the image pickup time period of the pixel array.

6. A semiconductor image pickup device according to claim 1, wherein the automatic set point changing block comprises a memory for storing the set points so as to be read out in the image pickup time period of the pixel array.

7. A semiconductor image pickup device having a function to check a plurality of function circuit blocks, comprising:
    a pixel array for converting an optical signal of an image input into an electric signal to pickup the image;
    a plurality of automatic set point changing blocks for respectively producing a plurality of set points, which are different from each other, according to data input from outside the semiconductor image pickup device in an image pickup time period of the pixel array corresponding to one frame;
    the plurality of function circuit blocks, each corresponding to one of the automatic set point changing blocks, each function circuit block for respectively receiving each of the set points, at a timing which is different from timing in the other function circuit blocks, for correcting the electric signal obtained in the pixel array according to each of the set points at the corresponding timing in the image pickup time period of the pixel array corresponding to one frame, and for outputting the corrected electric signals, corresponding to the set points, to the outside;
    a set point register block for supplying a set point and control data to the function circuit block; and
    a selecting portion for selecting the respective set points of the function circuit block from the set point register block or the automatic set point changing block according to the control data from the set point register block.

8. A semiconductor image pickup device according to claim 7, wherein each automatic set point changing block comprises an increment function register for producing the set points by incrementing a set point by a prescribed value in the image pickup time period of the pixel array.

9. A semiconductor image pickup device according to claim 7, wherein each automatic set point changing block comprises a decrement function register for producing the set points by decrementing a set point by a prescribed value in the image pickup time period of the pixel array.

10. A semiconductor image pickup device according to claim 7, wherein each automatic set point changing block comprises a shift function register for producing the set points by repeatedly doubling or halving a set point in the image pickup time period of the pixel array.

11. A semiconductor image pickup device according to claim 7, wherein each automatic set point changing block comprises a plurality of set point registers for registering the set points so as to be read out in the image pickup time period of the pixel array.

12. A semiconductor image pickup device according to claim 7, wherein each automatic set point changing block comprises a memory for storing the set points so as to be read out in the image pickup time period of the pixel array.

13. A semiconductor image pickup device according to claim 7, wherein each automatic set point changing block comprises an automatic setting unit which produces the set points which are optimum to check the corresponding function circuit block.

* * * * *